United States Patent
Toebes (10) Patent No.: US 7,463,909 B1
(45) Date of Patent: *Dec. 9, 2008

(54) METHOD, DEVICE, AND DATABASE FOR PROVIDING COMMUNICATION ADDRESSES FOR COMMUNICATION DEVICES

(75) Inventor: John A. Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/262,109

(22) Filed: Oct. 27, 2005

Related U.S. Application Data (63) Continuation of application No. 09/715,979, filed on Nov. 17, 2000, now Pat. No. 6,961,590.

(51) Int. Cl.
H04B 1/38 (2006.01)
H04M 1/00 (2006.01)

(52) U.S. Cl. ............... 455/564; 455/403; 455/414.1; 455/418; 455/461; 455/551; 379/93.23; 379/218.01; 379/316; 379/355.02; 707/1; 707/2; 707/3; 707/5; 707/7

(58) Field of Classification Search ............. 455/403, 455/405, 414.1, 418, 425, 461, 519, 550.1, 455/551, 564, 566; 379/93.23, 100.03, 218.01, 379/315.02, 316, 114.01, 355.02; 707/1–7
See application file for complete search history.

(56) References Cited

U.S. PATENT DOCUMENTS

| | | | | |
|---|---|---|---|---|
| 4,341,929 A | * | 7/1982 | Alexander et al. | 379/359 |
| 5,457,738 A | | 10/1995 | Sylvan | 379/93.23 |
| 5,475,741 A | | 12/1995 | Davis et al. | 379/103 |
| 5,583,919 A | | 12/1996 | Talvard et al. | 379/88.03 |
| 5,768,362 A | * | 6/1998 | Moon | 379/355.05 |
| 5,835,089 A | * | 11/1998 | Skarbo et al. | 715/751 |
| 6,052,070 A | | 4/2000 | Kivelä et al. | 341/22 |
| 6,115,617 A | * | 9/2000 | Ib | 455/564 |
| 6,125,287 A | | 9/2000 | Cushman et al. | 455/566 |
| 6,169,911 B1 | | 1/2001 | Wagner et al. | 455/566 |
| 6,222,921 B1 | | 4/2001 | Mugura et al. | 379/354 |
| 6,243,595 B1 | * | 6/2001 | Lee et al. | 455/566 |
| 6,256,516 B1 | | 7/2001 | Wagner et al. | 455/565 |
| 6,320,957 B1 | | 11/2001 | Draganoff | 379/354 |
| 6,370,363 B1 | | 4/2002 | Fukuzato | 455/90 |
| 6,370,519 B1 | | 4/2002 | Kim | 707/1 |
| 6,374,125 B1 | * | 4/2002 | Toba | 455/563 |
| 6,411,950 B1 | * | 6/2002 | Moricz et al. | 707/3 |
| 6,430,405 B1 | * | 8/2002 | Jambhekar et al. | 455/403 |
| 6,442,270 B1 | | 8/2002 | Simon et al. | 379/355.09 |
| 6,504,925 B1 | | 1/2003 | Schlachman et al. | 379/354 |
| 6,510,235 B1 | | 1/2003 | Shin et al. | 382/100 |
| 6,618,586 B2 | | 9/2003 | Inoue | 455/415 |

FOREIGN PATENT DOCUMENTS

| | | | |
|---|---|---|---|
| JP | 404158697 A | 6/1992 | |
| JP | 407095275 A | 4/1995 | |

* cited by examiner

Primary Examiner—Stephen M D'Agosta
(74) Attorney, Agent, or Firm—Baker Botts L.L.P.

(57) ABSTRACT

The present invention includes a method, device, and database for providing communication addresses for communication devices. In one form, a method for providing a communication address for establishing communication with a communication device is disclosed. The method includes receiving an input character associated with a selectable communication address and determining a communication address reference based upon a communication criteria associated with the input character. The communication device may then display a communication address reference within a user interface in response to determining a communication address.

23 Claims, 3 Drawing Sheets

| ADDRESS (301) | DESCRIPTION (302) | FREQUENCY (303) | CURRENCY (304) |
|---|---|---|---|
| 222.214.2321 | CLEANERS | 2 | 01/03/2000 11:30 |
| Toebes@cisco.com | JOHN TOEBES | 32 | 08/08/2000 23:05 |
| ROOM 2042 | EXECUTIVE SUITES | 3 | 12/07/1999 17:16 |
| http://214.00.21.23.01 | ARKIES DELI | 1 | 06/02/1999 8:27 |
| www.cico.com/call.hlm | CISCO NetCall | 13 | 06/08/2000 12:22 |
| ⋮ | ⋮ | ⋮ | ⋮ |

| FREQUENCY SUBSET | | |
|---|---|---|
| FREQUENCY | ADDRESS | DESCRIPTION |
| 33 | http://214.00.21.23.03 | TEXAS PHILLIP |
| 27 | 214.333.9797 | TED SIMON |
| 15 | www.teltra.com/netphone | TELTRA INTER |
| 10 | Toebes@cisco.com | TOEBES, J |
| 10 | 512.345.5545 | TILLMAN, S |
| ⋮ | ⋮ | ⋮ |

| CURRENCY SUBSEL | | |
|---|---|---|
| CURRENCY | ADDRESS | DESCRIPTION |
| 08/08/2000, 11:30 | 919.992.2157 | FRENDO, M |
| 08/08/2000, 07:45 | 919.992.2121 | VOLPI, M |
| 08/07/2000, 23:57 | Toebes@cisco.com | TOEBES, J |
| 08/07/2000, 22:01 | www.cisco.com | CISCO SYSTEMS |
| ⋮ | ⋮ | ⋮ |

| DESCRIPTION SUBSET | | |
|---|---|---|
| DESCRIPTION | ADDRESS | FREQUENCY |
| ARKIES DELI | http://214.00.21.23.01 | 1 |
| JADE GARDEN | 214.953.6509 | 11 |
| BERNARD SULTZ | http://215.01.21.23.01 | 11 |
| JOHN TOEBES | Toebes@cisco.com | 32 |
| ⋮ | ⋮ | ⋮ |

309

METHOD, DEVICE, AND DATABASE FOR PROVIDING COMMUNICATION ADDRESSES FOR COMMUNICATION DEVICES

CROSS REFERENCE TO RELATED APPLICATIONS

This application is a continuation of U.S. application Ser. No. 09/715,979 filed Nov. 17, 2000 now U.S. Pat. No. 6,961,590 and entitled "Method, Device, and Database for Providing Communication Addresses for Communication Devices".

TECHNICAL FIELD

The present invention generally relates to the field of communication, and more particularly, to a method, device, and system for providing communication addresses for communication devices.

BACKGROUND OF THE INVENTION

Designers of most conventional telephone devices (cellular phones, residential phones, business phones, etc.) have attempted to create efficient access to recent dial lists and speed dial lists for users of such devices. However, due to the complexity of most user interfaces associated with programming telephone devices, users typically do not take advantage of available features.

Some conventional telephone devices provide a list of recently dialed numbers allowing a user to scroll through the list until the desired number is displayed. However, a user may have to scroll through several telephone numbers before locating the desired number to call. Additionally, due to limited amounts of memory available for conventional telephones, a desired number may not be stored within memory and therefore unavailable for display.

SUMMARY OF THE INVENTION

In accordance with the teachings of the present invention, a method, device and database are described for providing communication addresses for communication devices. According to one aspect of the present invention, a method for providing a communication address for establishing communication with a communication device is disclosed. The method includes receiving an input character associated with a selectable communication address and determining a plurality of communication addresses based upon a communication criteria and the input character. The method further includes displaying the communication addresses within a user interface and ordering a subset based upon the input character and the communication criteria.

According to another aspect of the present invention a communication device is provided. The communication device includes a processor module operable to determine a communication address based upon a communication criteria and an input character and memory to store communication addresses and coupled to the processor. The communication device further includes a communication module operable to initiate communication using a selected communication address and provide information associated with updating memory in response to initiating communication.

According to another aspect of the present invention, a communication device for providing a communication address is provided. The communication device includes means for receiving an input character associated with a selectable communication address, means for determining a plurality of communication addresses based upon a communication criteria and the input character and means for displaying the communication addresses within a user interface. The communication device further includes means for ordering a subset based upon the input character and the communication criteria.

According to a further aspect of the present invention, a computer readable medium for use with a communication device having a processor for processing a program of instructions is provided. The computer readable medium includes a method for receiving an input character associated with a selectable communication address and determining a plurality of communication addresses based upon a communication criteria and the input character. The method further includes displaying the communication addresses within a user interface and ordering a subset based upon the input character and the communication criteria.

According to another aspect of the present invention, a database of communication addresses for use with a communication device includes at least one communication address operable to initiate a communication and at least one parameter associated with a communication criteria. The database further includes a parameter associated with the communication address and operable to be altered in response to initiating the communication.

It is a technical advantage of certain embodiments of the invention to provide a passive and ordered list of communication addresses without deploying extensive software programming. Ordering and selection of addresses may be provided based upon usage parameters associated with the communication addresses.

It is another technical advantage of certain embodiments of the invention to provide a communication device having access to communication addresses stored within memory. The communication address references include a frequency parameter and/or a currency parameter which may be used to generate a subset of communication addresses.

It is a further technical advantage of certain embodiments of the invention to update memory based upon successfully initiating communication with a communication device. The memory may be updated using a frequency parameter and/or a currency parameter associated with the communication address reference. According to one aspect, memory may be updated by removing obsolete communication address references in response to unsuccessful communication.

It is another technical advantage of certain embodiments of the invention to update memory by determining utilization of a communication address based upon a storage criteria. As such, infrequently used addresses may be removed from memory thereby making room for new entries.

It is a further technical advantage of certain embodiments of the invention to provide a communication device for displaying addresses based upon a communication criteria. The addresses may be displayed within a list and accessed using a scroll button thereby reducing the amount of input required by a user.

It is another technical advantage of certain embodiments of the invention to update communication addresses entries based upon a communication criteria without requiring a user to enter or program a communication device with the most frequent or recently used communication addresses. Communication addresses may be autopopulated within memory based upon a communication criteria reducing interaction required to maintain desired communication addresses.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The conceptual groundwork for the present invention involves accessing communication addresses for communication devices. In one form, a communication device having a user interface receives an input, such as a character, associated with selecting a desired communication address. The communication device may then determine a communication address reference based upon a communication criteria associated with the input character and display the communication address reference within a user interface. As such, substantially minimal input may be required by a user to access a desired communication address reference for initiating communication.

In a particularized form, a communication device may access at least one database subset generated based upon a communication criteria. A communication reference associated with a communication address may then be displayed within a user interface. For example, a user may enter the first character of a reference (i.e., name, website, phone number, etc.) associated with a desired communication address. As such, additional characters of the most frequently used communication address may be automatically populated and displayed with the user interface. For example, a user may input the character "c" and a subset may be generated for all database entries of the most frequently used communication addresses that begin with the letter "c". As such, the first entry of a database subset, such as "Cisco," may be populated and displayed within the user interface. Upon displaying the communication reference, the communication device may then initiate communication with a second communication device based upon a communication address associated with the displayed communication reference. As such, a user may access a database of communication references using minimal input, while increasing access efficiency of communication addresses.

Figure 1:
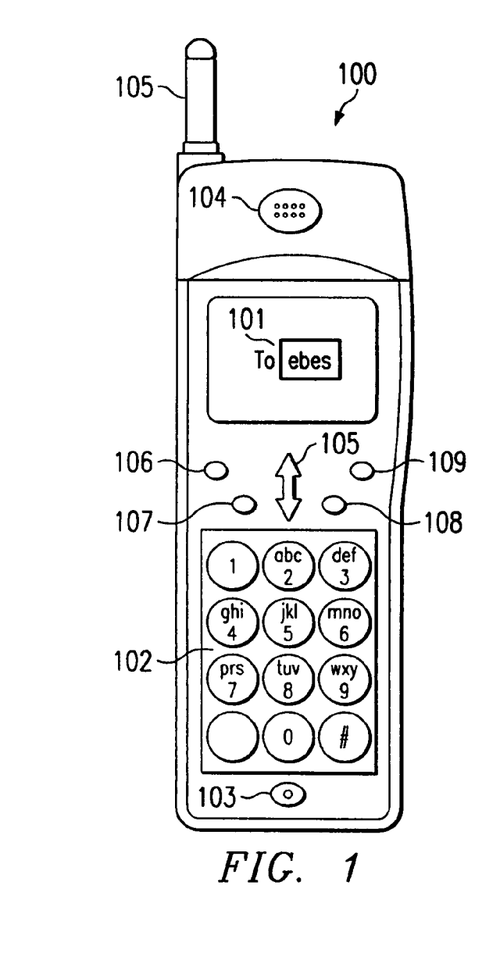
FIG. 1 illustrates one embodiment of a communication device operable to access communication addresses according to teachings of the present invention.

FIG. 1 illustrates a communication device operable to access communication addresses. A communication device, shown generally at 100, may be a cellular phone, a telephone, a wireless phone, a computer system based phone, or other communication or telephonic devices. Communication device 100 includes a display 101 an input keyboard 102, a microphone 103, a speaker 104, and a scroll button 105. Communication device 100 further includes any number and arrangement of function buttons such as a first function button 106, a second function button 107, a third function button 108, and a fourth function button 109.

Communication device 100 may further include associated hardware and software for providing communication with a second communication device or system. For example, communication device 100 configured as a cellular phone may include a transceiver, an antenna, a power source, a processor, memory, and other electronic modules and devices which may enhance the functionality and use of the communication device 100. Memory may include random access memory (RAM), read only memory (ROM), electrically erasable programmable read only memory (EEPROM), magnetic media such as hard disk drives, floppy disk drives, minidisks, tape drives or other memory devices operable to store information such as communication addresses, parameters, communication criteria, etc.

Communication device 100 may include a processor module operable to determine a communication address reference based upon a communication criteria associated with an input character. The character may be input in many ways such as pressing a key on keyboard 102 a predetermined number of times to display a desired character. For example, a user may select the "6" key three times to enter the character "o." Other embodiments may include providing any combination of function buttons, scroll buttons, keys, etc. for displaying a character.

Communication device 100 also includes a communication module operable to initiate communication using a selected communication reference. For example, a user may select the most frequently called communication address reference that begins with the character "X." As such, a communication module associated with communication device 100 may initiate communication with a second communication device using a communication address for the selected communication reference.

Function buttons 106, 107, 108, 109 provide enhanced communication and functionality of communication device 100. For example, first function button 106 may be operable as an email function button for accessing a user's email account using communication device 100. Function buttons 106, 107, 108, 109 may be programmed or pre-programmed for other functions such as speed dialing, accessing voicemail accounts, accessing Internet home pages or favorite pages, responding to voicemail messages, responding to email messages, accessing received teletex wireless pages, or other functions which may be utilized by communication device 100.

In one embodiment, function buttons 106, 107, 108, 109 enhance efficiency for accessing a communication address. For example, use of first function button 106 may initiate automatic generation of a subset of the most frequently used communication addresses. As such, a user may enter the first character of a communication address, or reference to a communication address, and subsequently select first function button 106 to automatically generate a subset of most frequently used communication addresses beginning with the input character. Function buttons 106, 107, 108, 109 may be programmed or pre-programmed to include several different types of communication criteria for accessing communication addresses and references. Such communication criteria may include "most recently called", "most frequently called", "user defined categories", "businesses called", "alphabetical listings", "friends called", "family called", "restaurants called", or other communication criteria operable to generate subsets for accessing communication addresses. Also, several communication criteria may be used in various combinations to display addresses thereby allowing for efficient access to communication addresses for a plurality of communication criteria.

During use, communication device 100 receives an input for selecting a communication address. Communication addresses are not limited to telephone numbers and may include various addresses such as web addresses, URL addresses, internet protocols, session initiation protocols, or other addresses or protocols for providing or establishing communication between a first communication device and a second communication device. Communication device 100 having user interface 101 may provide a user efficient access to addresses stored within a database operably associated with communication device 100. Communication device 100 displays communication addresses or references within user interface 101 based upon a communication criteria for providing desired addresses stored within a database. For example, a user may input a first character of an address using input keyboard 102. Upon a user inputting a first character, communication device 100 may access a database based upon the input character such as a letter, a number or portion of memory, or other characters operably associated with a communication address. Communication device 100 may then provide a database subset using the input character and a communication criteria.

For example, a user may want to access a list of the most recently used telephone numbers for individuals that begin with the character "r". As such a user may enter the character "r" by pressing the "7" key twice and communication device 100 may access a database to provide a list of references or names of individuals beginning with the character "r". In another embodiment, a user may enter a string of characters to access a list of email addresses for employees working at a specific place of business. For example, a user may enter "@Cisco" to generate a subset of available email addresses for Cisco Systems, Inc.

In one embodiment, a user may also include a communication criteria such as frequency of use, description of an address, most recent or least recently called, or other criteria which may provide efficient access to desired communication addresses and associated address information. For example, upon receiving an input from a user, communication device 100 may generate a database subset based upon a communication criteria such as the most frequently called telephone numbers beginning with the character "T". Upon generating a database subset, communication device 100 may display the references within user interface 101. reference to a network address, such as the name "TeleCisco" associated with a network address, may be displayed within user interface 101. A user may then initiate communication using the reference displayed within user interface 101 to establish communication with "TeleCisco".

In another embodiment, several addresses beginning with the same character or string of characters may be included within a database subset. For example, references to addresses may be displayed based upon one or more communication criteria associated with a communication address. As such, the most frequently and recently used communication addresses may be displayed prior to the next most frequently and recently used communication address thereby providing a user access to the most frequently and recently used communication addresses. Any combination of communication criteria may be used to generate a database subset for accessing communication addresses.

In one embodiment, a user accesses several references associated with communication addresses using scroll button 105. For example, a user may input a character and a database subset of communication addresses may be generated based upon the input character and the frequency at which the communication addresses have been used. As such, a user may access the most frequently used references by depressing the up/down arrow on scroll button 105 thereby populating user interface 101 with a list of the most frequently used addresses beginning with the input character.

In another embodiment, a user may input a character and a database subset may be generated based upon a currency parameter. A currency parameter may be used to provide the most current date and/or time a communication address was used. For example, a user may input the character "T" and a database subset of the most previously called addresses beginning with the character "T" may be generated using a currency parameter. As such, a user may access references using scroll button 105 allowing a user to access the most previously used or accessed communication addresses.

Figure 2:
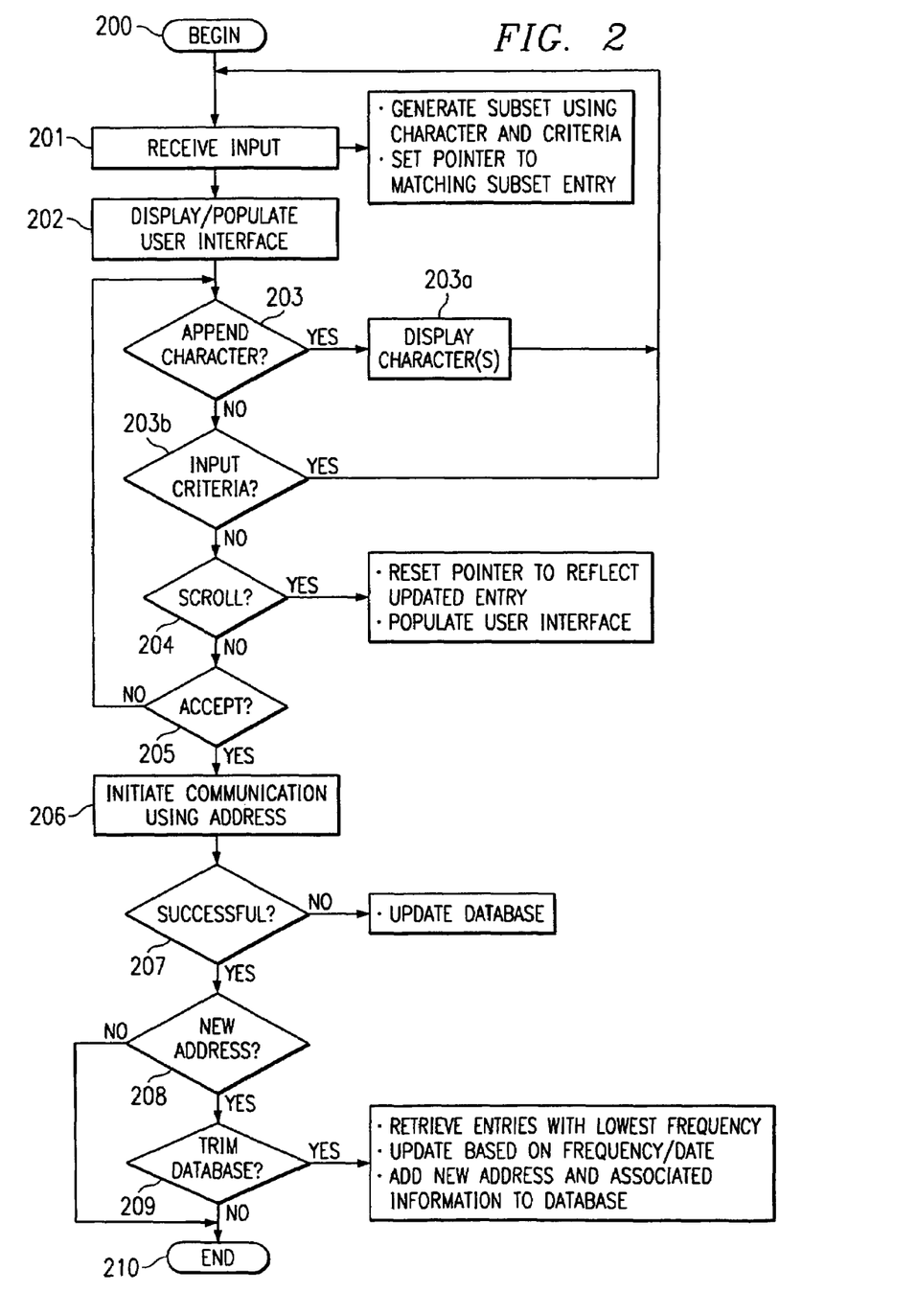
FIG. 2 illustrates one embodiment of a method for populating addresses within a user interface of a communication device according to teachings of the present invention.

FIG. 2 illustrates a method for populating addresses within a user interface of a communication device. The method may be used in association with the communication device illustrated in FIG. 1 or other communication devices or systems operable to use the method of FIG. 2.

The method begins generally at step 200. At step 201, a user may provide an input character of a reference to a desired communication address. Upon receiving an input, the method may generate a database subset based upon the input character and a communication criteria. The method may assign a value to a pointer matching an entry within the generated database subset. For example, a database subset may be generated based upon most frequently used telephone numbers that begin with the character "S".

Upon receiving an input the method proceeds to step 202 where the method displays an input character and populates a user interface with a database entry. For example, a user may input the character "R" and the method may display the character "R" and populate the user interface with the first entry of a generated database subset such as "Roberts". However, in one embodiment a database entry may not be available and only the input character may be displayed as required.

Upon displaying or populating an input character within the user interface, the method proceeds to step 203 where a user may append the input character. For example, a user may input an additional character thereby creating a string of characters. If a user appends the character, the method displays the input characters at step 203*a* and proceeds to step 201 where a database subset may be updated based upon the appended character and communication criteria.

In one embodiment, a database subset may be generated based upon a character string. As such a user may enter several characters and a database subset may be generated based upon the entered characters. In this manner, a user may narrow or reduce the number of entries within a database subset allowing efficient and expedient access to voluminous communication addresses of references beginning with the entered character string.

For example, a user may input an additional communication criteria for generating a list of communication addresses. For example, a database subset may be generated for the most frequently used communication addresses. Upon a user not appending a character, the method proceeds to step 203b where a user may input an additional communication criteria. For example, a user may provide an additional communication criteria such as a business criteria for accessing business communication addresses. As such, the method may generate a database subset of frequently used business communication addresses for a user.

Upon a user not appending a character, (e.g. a predetermined period of time expires without receiving an input) or adding a criteria, the method proceeds to step 204 where a user may scroll entries within the generated database subset. For example, a subset may be generated for the most frequently used addresses beginning with "TO" and a user may scroll references to addresses beginning with the characters "TO". In this manner, a user may not need to know an entire description of a communication address allowing the user to efficiently access references to addresses having descriptions beginning with "TO".

If a user does not scroll the entries within the generated database subset, the method proceeds to step 205 where a user can accept the displayed reference. If a user does not accept the reference, the method proceeds to step 203 where a user may append or delete a character and scroll as needed. However, if a user accepts the reference, the method proceeds to step 206 where the user may initiate communication using the displayed reference. For example, the reference may be associated with a telephone number of a place of business. As such, the communication device may establish communication using a communication address associated with the displayed reference.

Upon initiating communication, the method proceeds to step 207 where the method determines if the communication was successful. For example, a positive confirmation of a successful telephone call may be provided using a session initiation protocol (SIP) or other protocols operable to provide an indication of a successfully initiated communication. SIP may be used to provide a negative confirmation that a call was not successfully placed. As such, the method may update the database to delete a telephone number or communication address which may no longer be responsive to communication initiation. For example, a telephone number for a place of business may be changed thereby making a previous telephone number listed within the database obsolete. As such, the obsolete telephone number may be removed from the database.

In a similar manner, the communication device may attempt to establish communication with a network location or website which may be obsolete. As such, the method may remove the network location from the database. In this manner, the method may update a database by deleting obsolete entries thereby increasing storage capacity of the database while providing current communication addresses.

The method may also update database parameters located within the database and associated with a selected entry. For example, if a call is successfully placed, the method may increment a counter or value associated with a frequency parameter within the database. In a similar manner, the method may update a currency parameter associated with a database entry for a successful communication. Other parameters may also be updated thereby providing updated information associated with communication address entries.

Upon determining whether or not the communication was successful the method proceeds to step 208 where the method determines if a new address has been entered. For example, a user may input a new address and successfully initiate communication using the newly entered address. As such, information associated with the new communication address may be entered into a database associated with the communication device. For example, information similar to information obtained using conventional caller identification systems may be automatically obtained and entered within the database. For example, communication reference information for a specific communication band, or in-band information, may be obtained for a communication database. Such information may be obtained using an automatic number identifier (ANI), a dial number identification service (DNIS) a lightweight directory access protocol (LDAP) or other services or protocols which may provide information for a database entry which may include an individual's name, a business name, a communication address, a telephone number, a date and time, or any other information which may be obtained and entered with the database as needed.

In one embodiment, information associated with communication initiated by a second party (i.e. incoming telephone call) may be included and/or updated within the database. For example, communication information for an incoming telephone call initiated by a second party may automatically be stored within the database. As such, upon further communication being established with the second party, one or more parameters associated with a database entry for the second party may be updated as required. As such, the method advantageously allows for efficient population of a database by storing information within memory using an associated parameter. In this manner, addresses do not have to be manually programmed into memory thereby reducing user input while providing enhanced functionality and use of communication addresses for communication devices.

The method then proceeds to step 209 where the method may determine availability of memory and trim a database as required prior to entering a new communication address. For example, a database may be updated based upon several communication criteria using one or more parameters such as a frequency parameter, a currency parameter, etc. or other criteria as desired. In this manner, a current database of addresses may be maintained based upon one or more criteria allowing a user to access desired communication addresses, telephone numbers, description information, etc. Upon trimming the database, the method then proceeds to step 210 where the method ends. As such, addresses may be generated, sorted and maintained within memory based upon a communication criteria and/or utilization thereby reducing the amount of programming required by users for maintaining communication addresses.

Figure 3A:
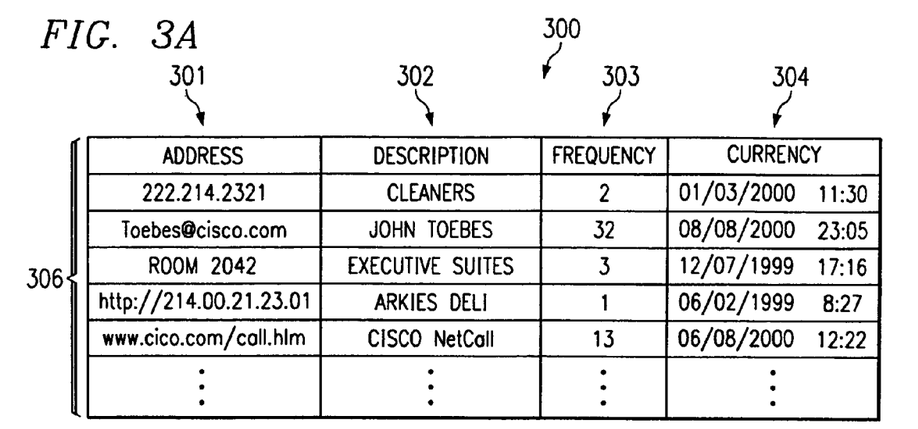
FIG. 3A illustrates one embodiment of a communication address database operably associated with a communication device according to teachings of the present invention.

FIG. 3A illustrates a communication address database operably associated with a communication device. The database illustrated in FIG. 3A may be used in association with the method of FIG. 2 or other methods operable to use the database illustrated in FIG. 3A.

The database is illustrated generally at 300 includes several parameters for describing communication addresses stored within database 300. For example, database 300 may include entries stored within array 306 and may include an address parameter 301, a description parameter 302, a frequency parameter 303, and a currency parameter 304. In one embodiment, database 300 may be accessed to generate a subset database based upon a communication criteria. For example, a frequency subset 307, generally illustrated in FIG. 3B, may be generated based upon the number of times a communication address was used. In one embodiment, frequency subset 307 may be generated based upon an input character of "T".

Figure 3B:
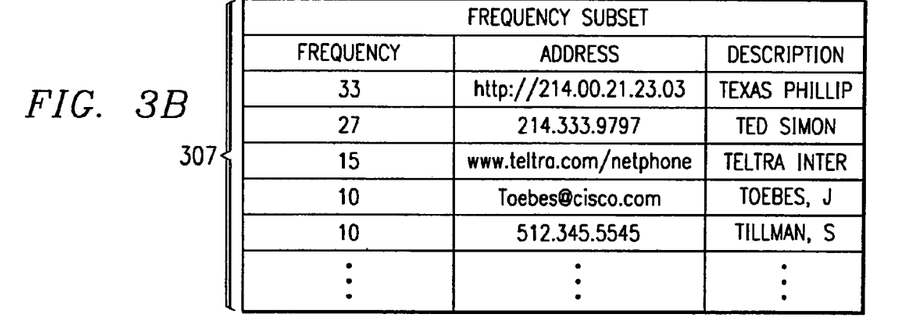
FIG. 3B illustrates one embodiment of a communication address database frequency subset operably associated with a communication device according to teachings of the present invention.

As such, frequency subset 307 may be generated to include the most frequently used addresses which begin with the character "T". A communication device may then populate a user interface and display the most frequently used address generated within frequency subset 307. A user may scroll frequency subset 307 to view frequently used communication addresses which begin with the letter "T".

Figure 3C:
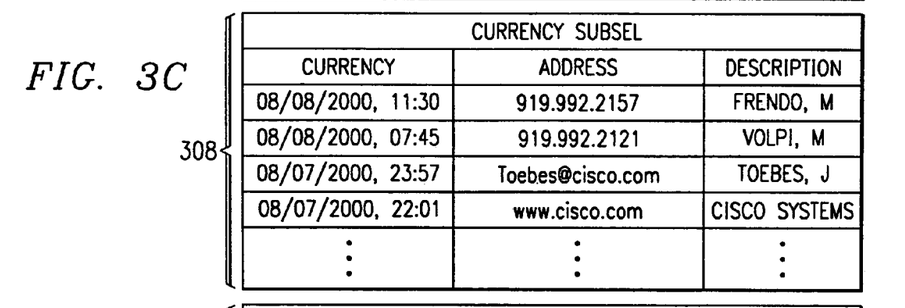
FIG. 3C illustrates one embodiment of a communication address database currency subset operably associated with a communication device according to teachings of the present invention.

FIG. 3C illustrates a communication address database currency subset 308. Database 300 may be accessed to generate currency subset 308 based upon the date and time communication addresses are used. For example, currency subset 308 may include the most recently called or accessed communication addresses. Additionally, the currency subset 308 may be generated based upon an input character input by a user. For example, a user may input a character of "9" and a subset may be generated based upon the communication addresses and/or address descriptions which were most recently used and begin with the character "9". In this manner, a user may efficiently access a database of the most recently used communication addresses based upon an input character and a currency parameter.

Figure 3D:
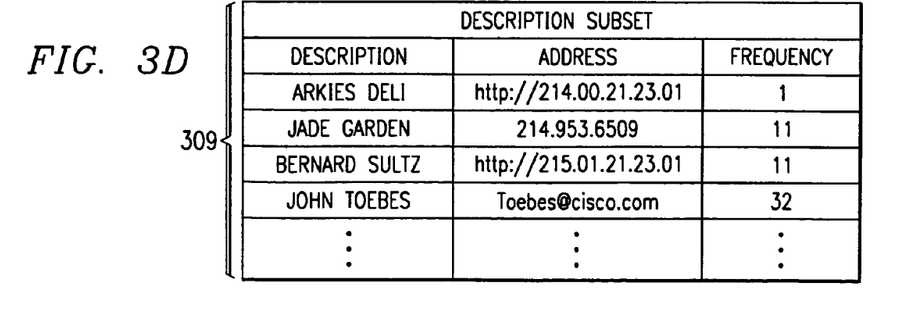
FIG. 3D illustrates one embodiment of a communication address database description subset operably associated with a communication device according to teachings of the present invention.

FIG. 3D illustrates a communication address database description subset 309 operably associated with a communication device. Database 300 may be used to generate description subset 309. Description subset 309 may be generated based upon a user inputting a character or string of characters. For example, a user may generate description subset 308 for addresses having character strings which begin with a predetermined sequence of characters. As such, description subset 308 may include addresses having character strings input by a user and may be provided in alphabetical order as illustrated in description subset 309. Description subset 308 may also be ordered based upon an additional criteria, for example, description subset 308 may include any business addresses of the most frequently used communication addresses.

Though not illustrated, subsets 307, 308 and 309 may be altered based upon additional criteria. For example, a user may want to display the most frequently used communication addresses having a description beginning with the character "S". Additionally, a user may want to access only communication addresses for family members. As such, an additional subset (not expressly shown) of frequency subset 307 may be generated to provide a user access to a database subset of the most frequently used family member communication addresses which begin with the character "S". In this manner, several combinations or filters using one or more communication criteria may be used to generate a subset.

Figure 4:
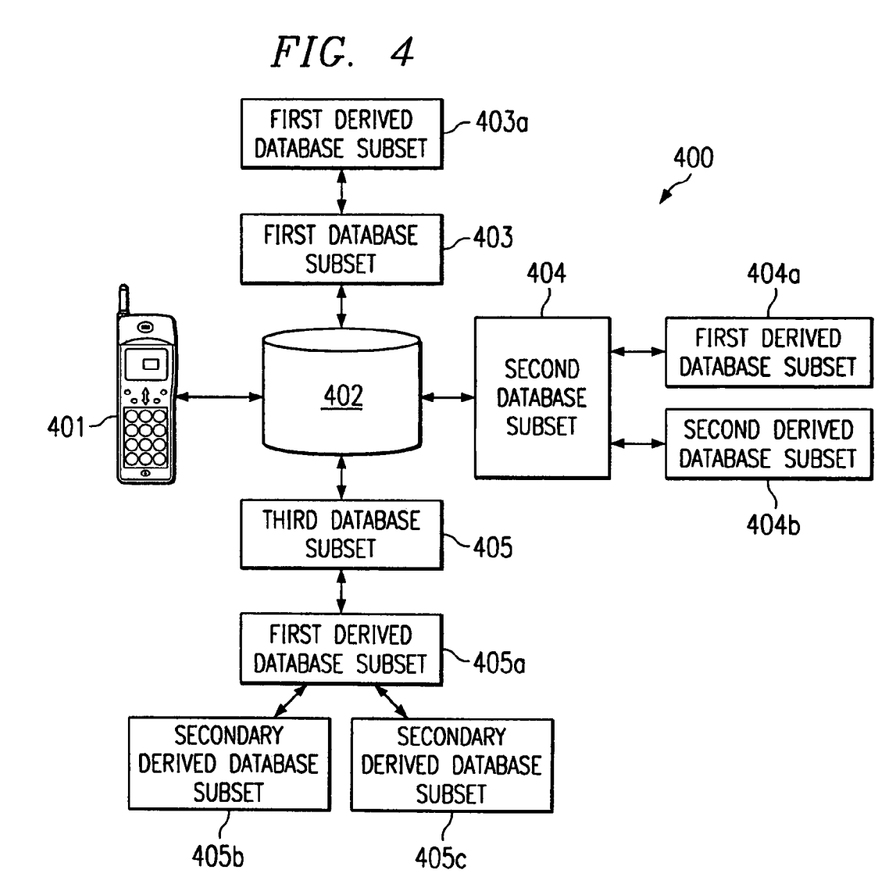
FIG. 4 illustrates one embodiment of a communication device for displaying communication address references according to teachings of the present invention.

FIG. 4 illustrates a communication device for displaying communication address references. The device, illustrated generally at 400, includes a communication device 401, a database 402, a first database subset 403, a second database subset 404, and a third database subset 405. Device 400 may further include additional database subsets associated with database subsets 403, 404, 405. For example, first database subset 403 may include a first derived database subset 403a. Likewise, second database subset 404 may include a first derived database subset 404a and a second derived database subset 404b. In a similar manner, a derived database subset may include a secondary derived database subset operable to further define information located within an associated derived database subset. For example, derived database subset 405a may include secondary derived database subsets 405b and 405c.

During use database 402 may be accessed by communication device 401 to populate a user interface for providing a user access to communication addresses for establishing communication with a second communication device (not expressly shown). A user may input a character or string of characters and device 400 may generate a database subset based upon the input character. Additionally, a database subset may be generated based upon a criteria as described above. For example, device 400 may generate a frequency subset, a description subset, and/or a most recently used subset based upon the input character. Device 400 may then populate a user interface with a reference beginning with the input character. In this manner, a user may only need to input a single character to view references to available communication addresses, thereby reducing the amount of input required by a user.

Device 400 may be configurable as a computer system including software for providing access to network addresses operable to communicate information. For example, the computer system may include network telephone software and associated hardware allowing a user to establish communication with a second communication device via a network such as the Internet. In such an embodiment, the computer system may include a microphone and an input device operable to enable a user to input one or more characters for accessing a list of references associated with network addresses. For example, a user may use an input device to input a string of characters and device 400 may access database 402 to generate one or more database subsets based upon a criteria. First database subset 403 may be generated based upon receiving an input character string and first derived database subset 403a may be generated to include the most frequently used communication addresses beginning with the character string input by the user. In this manner, desired database subsets may be generated based upon an input character string thereby allowing device 400 to populate a user interface with a list of references associated with communication addresses without requiring a user to enter an entire string of characters.

As described above, device 400 provides several database subsets which may be generated based upon a user defined criteria. For example, a user may initially generate subset 405 based upon an input character and frequency. Subsequently, a user may generate derived database subset 405a based upon the most recently accessed network addresses. Additionally, a user may further narrow a subset to include only communication addresses for businesses. As such, a user may generate secondary derived database subset 405b to include only the most frequently accessed business communication addresses beginning within a single input character and most recently used. For example, a user may be able to identify a frequently and recently used or called restaurant telephone number through entering a single character.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for providing a communication address to a user of a communication device comprising:
receiving information identifying one of a plurality of communication criteria;
associating a button with the identified communication criteria;
detecting that a user has pressed a first button associated with an input character that is associated with at least one of a plurality of communication addresses;
detecting that the user has pressed a second button associated with a particular communication criteria that identifies a property associated with at least one of the plurality of communication addresses, wherein detecting that the user has pressed the second button comprises detecting that the user has pressed the button associated with the identified communication criteria;

identifying a subset of the plurality of communication addresses based on the input character and the communication criteria; and displaying the subset of communication addresses within a user interface.

2. The method of claim 1, further comprising receiving a second communication criteria that identifies a second property associated with at least one of the plurality of communication addresses, and wherein identifying the subset of communication addresses comprises identifying the subset based on the input character, the first communication criteria, and the second communication criteria.

3. The method of claim 1, wherein each of the communication addresses is associated with a party, and further comprising receiving a second communication criteria that identifies a property of at least one party associated with one of the plurality of communication addresses, and wherein identifying the subset of communication addresses comprises identifying the subset based on the input character, the first communication criteria, and the second communication criteria.

4. The method of claim 1, wherein the communication criteria identifies a recently-called property, and wherein identifying the subset of communication addresses based on the input character and the first communication criteria comprises identifying, from among a predetermined number of most recently called communication addresses, a subset of communication addresses based on the input character.

5. The method of claim 1, wherein the communication criteria identifies a frequently-called property, and wherein identifying the subset of communication addresses based on the input character and the first communication criteria comprises identifying, from among a predetermined number of most frequently called communication addresses, a subset of communication addresses based on the input character.

6. A method for providing a communication address to a user of a communication device comprising:

receiving information identifying one of a plurality of communication criteria;

associating a button with the identified communication criteria;

detecting that a user has pressed a first button associated with an input character that is associated with at least one of a plurality of communication addresses, wherein each of the plurality of communication addresses is associated with a party;

detecting that the user has pressed a second button associated with a particular communication criteria that identifies a property of at least one party associated with one of the communication addresses, wherein detecting that the user has pressed the second button comprises detecting that the user has pressed the button associated with the identified communication criteria;

identifying a subset of the plurality of communication addresses based on the input character and the communication criteria; and displaying the subset of communication addresses within a user interface.

7. The method of claim 6, wherein the communication criteria identifies a business property, and wherein identifying the subset based on the input character and the communication criteria comprises identifying, from among a plurality of the communication addresses that are associated with businesses, a subset of the communication addresses based on the input character.

8. The method of claim 6, wherein the communication criteria identifies a business type property, and wherein identifying the subset based on the input character and the communication criteria comprises identifying, from among a plurality of the communication addresses that are associated with a particular type of business, a subset of the communication addresses based on the input character.

9. The method of claim 6, further comprising:

receiving information defining a group of parties associated with a selected communication criteria; and storing the information defining the group of parties; and wherein:

receiving the communication criteria comprises receiving the selected communication criteria; and identifying the subset based on the input character and the communication criteria comprises identifying, from among the communication addresses associated with the group of parties, a subset of communication addresses based on the input character.

10. The method of claim 9, wherein receiving information defining the group of parties associated with the selected communication criteria comprises receiving information defining a group comprising at least one of friends and family members of a user of a communication device.

11. The method of claim 6, further comprising receiving a second communication criteria, wherein the second communication criteria identifies a second property of at least one party associated with a communication address, and wherein identifying the subset of communication addresses comprises identifying the subset based on the input character, the first communication criteria, and the second communication criteria.

12. A communication device comprising:

a user interface operable to:

detect that a user has pressed a first button associated with an input character that is associated with at least one of a plurality of communication addresses; and detect that the user has pressed a second button associated with a communication criteria that identifies a property associated with at least one of the plurality of communication addresses;

memory to store the plurality of communication addresses;

a processor module operable to identify a subset of the plurality of communication addresses based on the input character and the communication criteria;

a display operable to display at least a portion of the subset of communication addresses, and wherein the user interface is further operable, after the display displays at least a portion of the subset of communication addresses, to receive information identifying a communication address selected from the subset by the user; and a communication module operable to initiate communication using the selected communication address, wherein the processor is further operable to:

receive information identifying one of a plurality of communication criteria; and associate a button with the identified communication criteria; and wherein the user interface is operable to detect that the user has pressed the second button by detecting that the user has pressed the button associated with the identified communication criteria.

13. The communication device of claim 12, wherein the user interface is further operable to receive a second communication criteria that identifies a second property associated with at least one of the plurality of communication addresses, and wherein the processor is operable to identify the subset of communication addresses by identifying the subset based on the input character, the first communication criteria, and the second communication criteria.

14. The communication device of claim 12, wherein:
each of the communication addresses is associated with a party;
the user interface is further operable to receive a second communication criteria that identifies a property of at least one party associated with one of the plurality of communication addresses; and
the processor is operable to identify the subset of communication addresses by identifying the subset based on the input character, the first communication criteria, and the second communication criteria.

15. The communication device of claim 12, wherein the communication criteria identifies a recently-called property, and wherein the processor is operable to identify the subset based on the input character and the communication criteria by identifying, from among a predetermined number of most recently called communication addresses, a subset of the communication addresses based on the input character.

16. The communication device of claim 12, wherein the communication criteria identifies a frequently-called property and wherein the processor is operable to identify the subset based on the input character and the communication criteria by identifying, from among a predetermined number of most frequently called communication addresses, a subset of the communication addresses based on the input character.

17. A communication device comprising:
a user interface operable to:
detect that a user has pressed a first button associated with an input character that is associated with at least one of a plurality of communication addresses, wherein each of the plurality of communication addresses is associated with a party; and
detect that the user has pressed a second button associated with a communication criteria identifying a property of at least one party associated with one of the communication addresses;
memory to store the plurality of communication addresses;
a processor module operable to identify a subset of the plurality of communication addresses based on the input character and the communication criteria; and
a display operable to display at least a portion of the subset of communication addresses, and wherein the user interface is further operable, after the display displays at least a portion of the subset of communication addresses, to receive information identifying a communication address selected from the subset by the user; and
a communication module operable to initiate communication using the selected communication address, wherein the processor is further operable to:
receive information identifying one of a plurality of communication criteria; and
associate a button with the identified communication criteria; and wherein the user interface is operable to detect that the user has pressed the second button by detecting that the user has pressed the button associated with the identified communication criteria.

18. The communication device of claim 17, wherein the communication criteria identifies a business property, and wherein the processor is operable to identify the subset based on the input character and the communication criteria by identifying, from among a plurality of the communication addresses that are associated with businesses, a subset of the communication addresses based on the input character.

19. The communication device of claim 17, wherein:
the processor is further operable to:
receive information defining a group of parties associated with a selected communication criteria; and
store in memory the information defining the group of parties; and wherein:
the user interface is operable to receive the communication criteria by receiving the selected communication criteria; and
the processor is operable to identify the subset based on the input character and the communication criteria by identifying, from among the communication addresses associated with the group of parties, a subset of the communication addresses based on the input character.

20. The communication device of claim 19, wherein the processor is operable to receive information defining the group of parties associated with the selected communication criteria by receiving information defining a group comprising at least one of friends and family members of a user of a communication device.

21. The communication device of claim 17, wherein the user interface is further operable to receive a second communication criteria, wherein the second communication criteria identifies a second property of at least one party associated with a communication address, and wherein the processor is operable to identify the subset of communication addresses by identifying the subset based on the input character, the first communication criteria, and the second communication criteria.

22. A system for providing a communication address to a user of a communication device comprising:
means for receiving information identifying one of a plurality of communication criteria;
means for associating a button with the identified communication criteria;
means for detecting that a user has pressed a first button associated with an input character that is associated with at least one of a plurality of communication addresses;
means for detecting that the user has pressed a second button associated with a particular communication criteria that identifies a property associated with at least one of the plurality of communication addresses, wherein the means for detecting that the user has pressed the second button comprises means for detecting that the user has pressed the button associated with the identified communication criteria;
means for identifying a subset of the plurality of communication addresses based on the input character and the communication criteria; and
means for displaying the subset of communication addresses within a user interface.

23. A system for providing a communication address to a user of a communication device comprising:
means for receiving information identifying one of a plurality of communication criteria;
means for associating a button with the identified communication criteria;
means for detecting that a user has pressed a first button associated with an input character that is associated with at least one of a plurality of communication addresses, wherein each of the plurality of communication addresses is associated with a party;
means for detecting that the user has pressed a second button associated with a particular communication criteria that identifies a property of at least one party associated with one of the communication addresses, wherein the means for detecting that the user has pressed the second button comprises means for detecting that the user has pressed the button associated with the identified communication criteria;
means for identifying a subset of the plurality of communication addresses based on the input character and the communication criteria; and
means for displaying the subset of communication addresses within a user interface.

* * * * *